United States Patent
Choi

(10) Patent No.: US 6,859,498 B1
(45) Date of Patent: Feb. 22, 2005

(54) TRANSMITTING/RECEIVED DATA PROCESSING METHOD FOR INHIBITING ERROR PROPAGATION IN DIGITAL IMAGE DATA COMMUNICATIONS SYSTEM AND RECORDING MEDIUM THEREFOR

(75) Inventor: Sung-kyu Choi, Kwangmyung (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 696 days.

(21) Appl. No.: 09/712,230

(22) Filed: Nov. 15, 2000

(30) Foreign Application Priority Data

Jan. 27, 2000 (KR) .......................................... 2000-4050

(51) Int. Cl.⁷ ................................................ H04N 7/12
(52) U.S. Cl. ................................................ 375/240.27
(58) Field of Search ....................... 375/240.07, 240.02, 375/240.12, 240.18, 240.24, 240.27; 348/384, 390, 401.1, 409.1, 420.1; 382/232, 236, 238; H04N 7/12

(56) References Cited

U.S. PATENT DOCUMENTS

| | | | |
|---|---|---|---|
| 5,333,137 A | * 7/1994 | Fujiyama | 714/821 |
| 5,416,600 A | * 5/1995 | Matsumi et al. | 386/112 |
| 5,528,284 A | * 6/1996 | Iwami et al. | 348/14.15 |
| 5,550,847 A | * 8/1996 | Zhu | 714/748 |
| 5,614,958 A | * 3/1997 | Shikakura | 348/616 |
| 5,847,763 A | * 12/1998 | Matsumura et al. | 375/240.15 |

FOREIGN PATENT DOCUMENTS

| | | |
|---|---|---|
| EP | 0 753 968 A2 | 1/1997 |
| EP | 753968 A2 | 1/1997 |
| EP | 0 763 944 A2 | 3/1997 |
| JP | 4-334189 | 11/1992 |
| JP | 6-38194 | 2/1994 |
| JP | 6-237451 | 8/1994 |
| JP | 7-23392 | 1/1995 |
| JP | 7-312755 | 11/1995 |
| JP | 7-322266 | 12/1995 |
| JP | 8-37663 | 2/1996 |

(List continued on next page.)

OTHER PUBLICATIONS

Wang et al., IEEE Transaction on Circuits and Systems for Video Technology, vol. 9, No. 3, pp. 514–517.

(List continued on next page.)

*Primary Examiner*—Nhon Diep
(74) *Attorney, Agent, or Firm*—Sughrue Mion, PLLC

(57) ABSTRACT

A method of inhibiting error propagation in a bidirectional digital compressed image data communication system is provided. A method of processing transmission data to inhibit error propagation in a digital image data communication system, includes (a) inputting an image frame from an external source, (b) checking for feedback error information including the location of an erroneous block on a compressed image frame detected during decoding by a decoder, the feedback error information received via a communication network, (c) if it is determined in step (b) that there is feedback error information, intracoding an erroneous block, the location of which is included in the feedback error information, and its search range, which is referred to encode the erroneous block using an intercoding method, among the image frame input in step (a), thereby constituting a compressed image frame, and (d) transmitting the compressed image frame constituted in step (c), via a communication network. When an error is detected by a decoder, it is fed back to an encoder, and the encoder uses a technique of compulsorily intercoding an erroneous block and the search range of the block with reference to feedback information, thereby inhibiting error propagation in a digital image data communication system.

11 Claims, 5 Drawing Sheets

FOREIGN PATENT DOCUMENTS

| JP | 9-37245 | 2/1997 |
|---|---|---|
| JP | 9-149421 | 6/1997 |
| JP | 10-145794 | 5/1998 |
| JP | 11-69355 | 3/1999 |
| JP | 11-220733 | 8/1999 |

OTHER PUBLICATIONS

Chinese Patent Office Action dated Nov. 21, 2003.

Wang J–T et al: "Error–Propagation Prevention Technique for Real–Time Video Transmission Over ATM Networks", IEEE Transactions on Circuits and Systems for Video Technology, IEEE INC., New York, US, vol. 9, No. 3, Apr. 1999, pp. 513–523, XP000824575, ISSN: 1051–8215.

Steinbach et al.: "Standard Compatible Extension of H.263 for Robust Video Transmission on Mobile Environments", IEEE Transactions on Circuits and Systems for Video Technology, IEEE INC., New York, US, vol. 7, No. 6, Dec. 1, 1997, pp. 872–881, XP000199011, ISSN: 1051–8215.

IEEE Transactions On, "Circuits and Systems for Video Technology ", A Publication of the Circuits and Systems Society, Dec. 1997, vol. 7, No. 6.

IEEE Transactions On, "Circuits and Systems for Video Technology", A Publication of The IEEE Circuits and Systems Society, Apr. 1999, vol. 9, No. 3.

\* cited by examiner

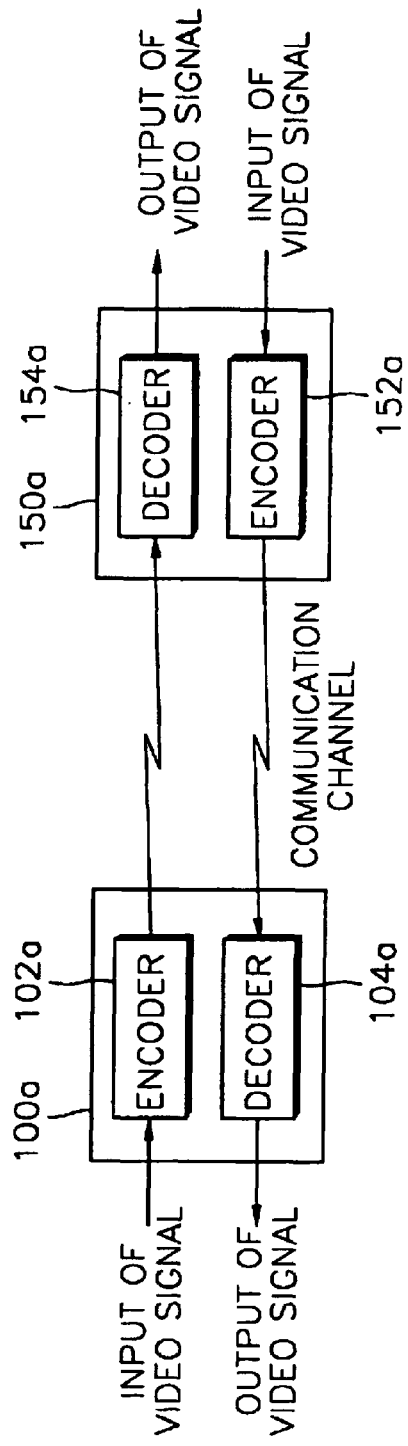

TRANSMITTING/RECEIVED DATA PROCESSING METHOD FOR INHIBITING ERROR PROPAGATION IN DIGITAL IMAGE DATA COMMUNICATIONS SYSTEM AND RECORDING MEDIUM THEREFOR

BACKGROUND OF THE INVENTION

1. Field of the Invention

The present invention relates to an image data communication system, and more particularly, to a method of inhibiting error propagation in a bidirectional digital compressed image data communication system. The present application is based on Korean Application No. 00-4050, which is incorporated herein by reference.

2. Description of the Related Art

FIG. 1A is a schematic diagram illustrating one way of configuring a bidirectional digital image data communication system. In FIG. 1A, two nodes 100a and 150a, which are connected to each other via a communication network, include encoders 102a and 152a, respectively, and decoders 104a and 154a, respectively, and communicate with each other via a bidirectional communication channel.

FIG. 1B is a schematic diagram illustrating another way of configuring a bidirectional digital image data communication system. In FIG. 1B, a node 100b includes only an encoder, and another node 150b includes only a decoder. In this case, image data is only transmitted from the node 100b having an encoder to the node 150b having a decoder via a forward channel. A backward channel is used to transmit feedback information on the image data received via the forward channel. Of course, a bidirectional digital image data communication system can be configured by the combination of FIGS. 1A and 1B.

In an image data communication system, image data undergoes data compression and decompression to effectively use the bandwidth of a communication channel. That is, an external video signal is compressed during encoding by the encoder 102a, 152a, or 100b and transmitted via a communication network. The decoder 104a, 154a, or 150b decompresses the received compressed image data to restore the original image data during decoding, and outputs a restored video signal.

FIG. 2A is a schematic diagram illustrating a way of encoding each image frame in a digital image data communication system.

The way of encoding an image frame includes intracoding and intercoding. Intracoding is encoding an image frame using the correlation between pixels within a screen, and intercoding is encoding a current image frame with reference to the previous frame (or the next frame) using the correlation between screens. An image frame encoded by intracoding is referred to as an I frame, and an image frame encoded by intercoding is referred to as a P frame. When an image frame is encoded with reference to the next image frame, it is referred to as a B frame. Hereinafter, the term P frame is used to refer to any interceded frame, including a B frame.

Intercoding generally has a high compression efficiency, so that most image frames are encoded by intercoding using the correlation between frames. That is, as shown in FIG. 2A, the first image frame 200a in a sequence is encoded by intracoding to constitute an I frame, and the subsequent image frames 210a, 220a, 230a and 240a are encoded by intercoding to constitute P frames, until the corresponding sequence is ended.

However, this intercoding method using the correlation between frames has a problem of error propagation. FIG. 2B is a schematic diagram illustrating a conventional error propagation mechanism in a digital image data communication system.

As shown in FIG. 2B, it is assumed that the first and second frames 200b and 210b in a sequence have no errors, while the third frame 220b has an error 222 at a specific block. If the intercoding method is used, the fourth frame 230b is encoded with reference to the third frame 220b, so that the error 222 in the third frame 220b is propagated into an error 232 in the fourth frame 230b. Similarly, the fifth frame 240b has an error 242 propagated from the error 232 of the fourth frame 230b.

That is, in the intercoding method, if an unrestorable error is generated at a specific block on a frame during transmission or for other reasons, it is not limited to the corresponding frame but affects the subsequent frames. Also, this propagated error is gradually magnified, since each block in a current frame is encoded with reference to both a corresponding block in the previous frame and its adjacent blocks in the intercoding method.

Various mechanisms have been designed for inhibiting the error propagation caused in the intercoding method. FIG. 2C is a schematic diagram illustrating a conventional error propagation prevention mechanism in a digital image data communication system.

In FIG. 2C, the I frame 200c is obtained by intracoding, and specific blocks 214, 224, 234, 244 of P frames 210c, 220c, 230c and 240c, respectively, obtained by intercoding, are compulsorily encoded by intracoding. A current recommendation is that an I block (which is a block compressed by intracoding) be included at least every 132 image frames, but a detailed method of selecting the I block is not prescribed separately.

In the intercoding method, encoding is performed using the correlation between frames, so that both a previous frame and a current frame are referred to during encoding, and a process such as discrete cosine transformation (DCT) for encoding includes a floating point operation. Of course, decoding also includes a similar floating point operation. However, the results of the floating point operations of an encoder and a decoder may have a slight difference depending on the type of the corresponding system. Thus, in order to prevent accumulation of this slight difference, inclusion of one I block at least every 132 image frames has been recommended.

The technique of compulsorily intercoding a specific block as shown in FIG. 2C prevents the propagation of an error which is caused by the difference between the result of floating point operation of an encoder and that of a decoder. However, this technique cannot fundamentally prevent propagation of an unrestorable error that occurs during transmission or for other reasons.

Of course, a decoder minimizes an error recognized by a person while visually watching images, using a technique such as concealment, when an unrestorable error is detected from a specific block on a received image frame. However, this technique cannot fundamentally correct an error, so the conventional intercoding method cannot prevent an error from being propagated from a frame to another frame.

SUMMARY OF THE INVENTION

To solve the above problem, an objective of the present invention is to provide a method of processing transmitting/received data to prevent error propagation in a digital image data communication system, in which a decoder feeds an error back to an encoder if the error is detected, and the encoder uses a technique of compulsorily intercoding a corresponding block and its search range with reference to feedback information, and a recording medium therefor.

To achieve the above objective, a method of processing transmission data to inhibit error propagation in a digital image data communication system, according to an aspect of the present invention, includes: (a) inputting an image frame from an external source; (b) checking for feedback error information including the location of an erroneous block on a compressed image frame detected during decoding by a decoder, the feedback error information received via a communication network; (c) if it is determined in step (b) that there is feedback error information, intracoding an erroneous block, the location of which is included in the feedback error information, and its search range, which is referred to to encode the erroneous block using an intercoding method, among the image frame input in step (a), thereby constituting a compressed image frame; and (d) transmitting the compressed image frame constituted in step (c), via a communication network.

Preferably, the error block location included in the feedback error information in step (b) is set in units of 16 (pixel)×16 (pixel) macro blocks.

It is also preferable that the search range in step (c) includes 16 pixels or 32 pixels in four directions on the basis of the erroneous block.

Preferably, the feedback error information in step (b) is associated with the image frame immediately preceding a current image frame.

A method of processing transmission data to inhibit error propagation in a digital image data communication system, according to another aspect of the present invention, includes: (a) inputting an image frame from an external source; (b) when the image frame input in step (a) is the first image frame in a specific sequence, encoding the entire image frame using an intracoding method, to constitute a compressed image frame; (c) when the image frame input in step (a) is not the first image frame in a specific sequence, checking feedback error information including the location of an erroneous block on a compressed image frame detected during decoding by a decoder, the feedback error information received via a communication network; (d) if it is determined in step (c) that there is feedback error information, intracoding an erroneous block, the location of which is included in the feedback error information, and its search range, which is referred to to encode the erroneous block using an intercoding method, among the image frame input in step (a), while the remaining area is encoded by intercoding, thereby constituting a compressed image frame, and if it is determined in step (c) that no feedback error information is received, intracoding block(s) selected by a predetermined method from among the blocks of the image frame input in step (a), and intercoding the remaining blocks, thereby constituting a compressed image frame; and (e) transmitting the compressed image frame constituted in step (b) or (d), via a communication network.

To achieve the above objective, a method of processing received data to inhibit error propagation in a digital image data communication system, according to an aspect of the present invention, includes: (a) receiving a compressed image frame via a communication network; (b) decoding the compressed image frame received in step (a) to constitute an image frame; (c) if an error is detected at a specific block on the compressed image frame received in step (a) during the decoding in the step (b), sending feedback error information including an error block location back to an encoder via a communication network; and (d) outputting an image frame restored in step (b).

To achieve the above objective, the present invention provides a computer-readable recording medium for recording a program which is executed in a computer for processing transmission data to inhibit error propagation in a digital image data communication system, according to an aspect of the present invention, wherein the program includes the steps of: (a) inputting an image frame from an external source; (b) checking feedback error information including the location of an erroneous block on a compressed image frame detected during decoding by a decoder, the feedback error information received via a communication network; (c) if it is determined in step (b) that there is feedback error information, intracoding an erroneous block, the location of which is included in the feedback error information, and its search range, which is referred to to encode the erroneous block using an intercoding method, among the image frame input in step (a), thereby constituting a compressed image frame; and (d) transmitting the compressed image frame constituted in step (c), via a communication network.

According to another aspect of the present invention, a computer-readable recording medium records a program which is executed in a computer for processing transmission data to inhibit error propagation in a bidirectional digital image data communication system, the program including the steps of: (a) inputting an image frame from an external source; (b) when the image frame input in step (a) is the first image frame in a specific sequence, encoding the entire image frame using an intracoding method, to constitute a compressed image frame; (c) when the image frame input in step (a) is not the first image frame in a specific sequence, checking feedback error information including the location of an erroneous block on a compressed image frame detected during decoding by a decoder, the feedback error information received via a communication network; (d) if it is determined in step (c) that there is feedback error information, intracoding an erroneous block, the location of which is included in the feedback error information, and its search range, which is referred to to encode the erroneous block using an intercoding method, among the image frame input in step (a), while the remaining area is encoded by intercoding, thereby constituting a compressed image frame, and if it is determined in step (c) that no feedback error information is received, intracoding block(s) selected by a predetermined method among the blocks of the image frame input in step (a), and intercoding the remaining blocks, thereby constituting a compressed image frame; and (e) transmitting the compressed image frame constituted in step (b) or (d), via a communication network.

To achieve the above objective, the present invention provides a computer-readable recording medium for recording a program which is executed in a computer for processing transmission data to inhibit error propagation in a digital image data communication system, wherein the program includes the steps of: (a) receiving a compressed image frame via a communication network; (b) decoding the compressed image frame received in step (a) to constitute an image frame; (c) if an error is detected at a specific block on the compressed image frame received in step (a) during the decoding in the step (b), sending feedback error information including an error block location back to an encoder via a communication network; and (d) outputting an image frame restored in step (b).

BRIEF DESCRIPTION OF THE DRAWINGS

The above objective and advantages of the present invention will become more apparent by describing in detail preferred embodiments thereof with reference to the attached drawings in which:

FIGS. 1A and 1B are schematic diagrams illustrating ways for configuring a bidirectional digital image data communication system;

DESCRIPTION OF THE PREFERRED EMBODIMENTS

In the preferred embodiments of the present invention, it is assumed that, when a decoder 350 detects an error, it can feed the information on the error back to an encoder 300 via a backward channel. Thus, the embodiments of the present invention are applied to the digital image data communication system of FIG. 1B and a combination of FIGS. 1A and 1B.

Figure 2A:
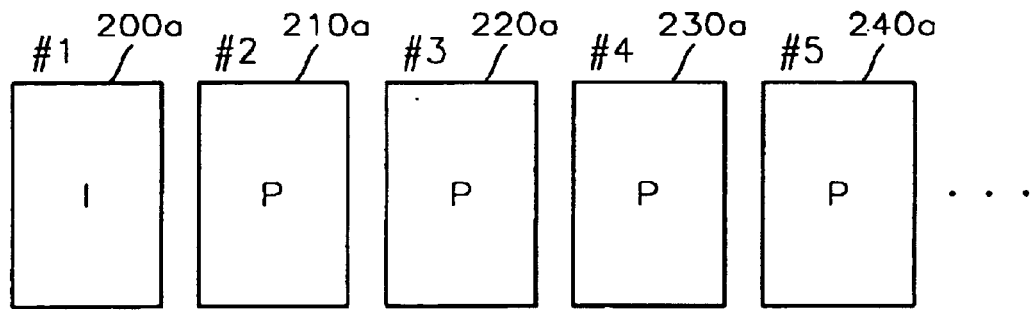
FIG. 2A is a schematic diagram illustrating a method of encoding image frames in a digital image data communication system.
Figure 2B:
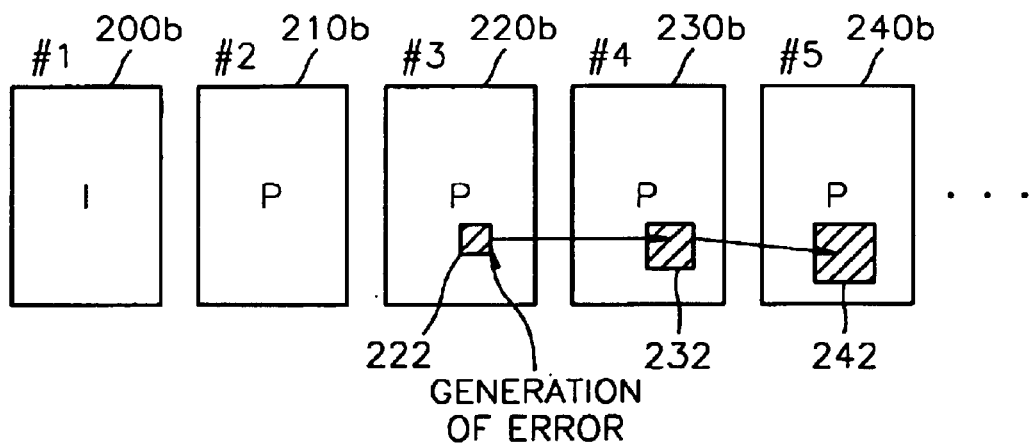
FIG. 2B is a schematic diagram illustrating a conventional error propagation mechanism in a digital image data communication system.
Figure 2C:
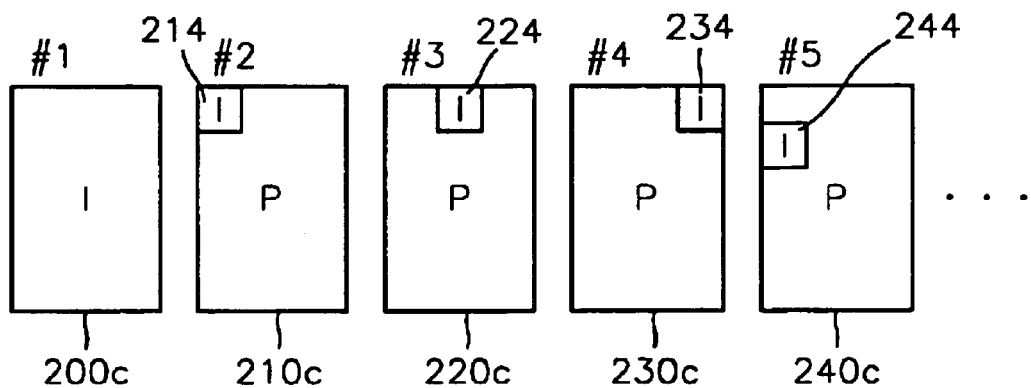
FIG. 2C is a schematic diagram illustrating a conventional error propagation preventing mechanism in a digital image data communication system.
Figure 3:
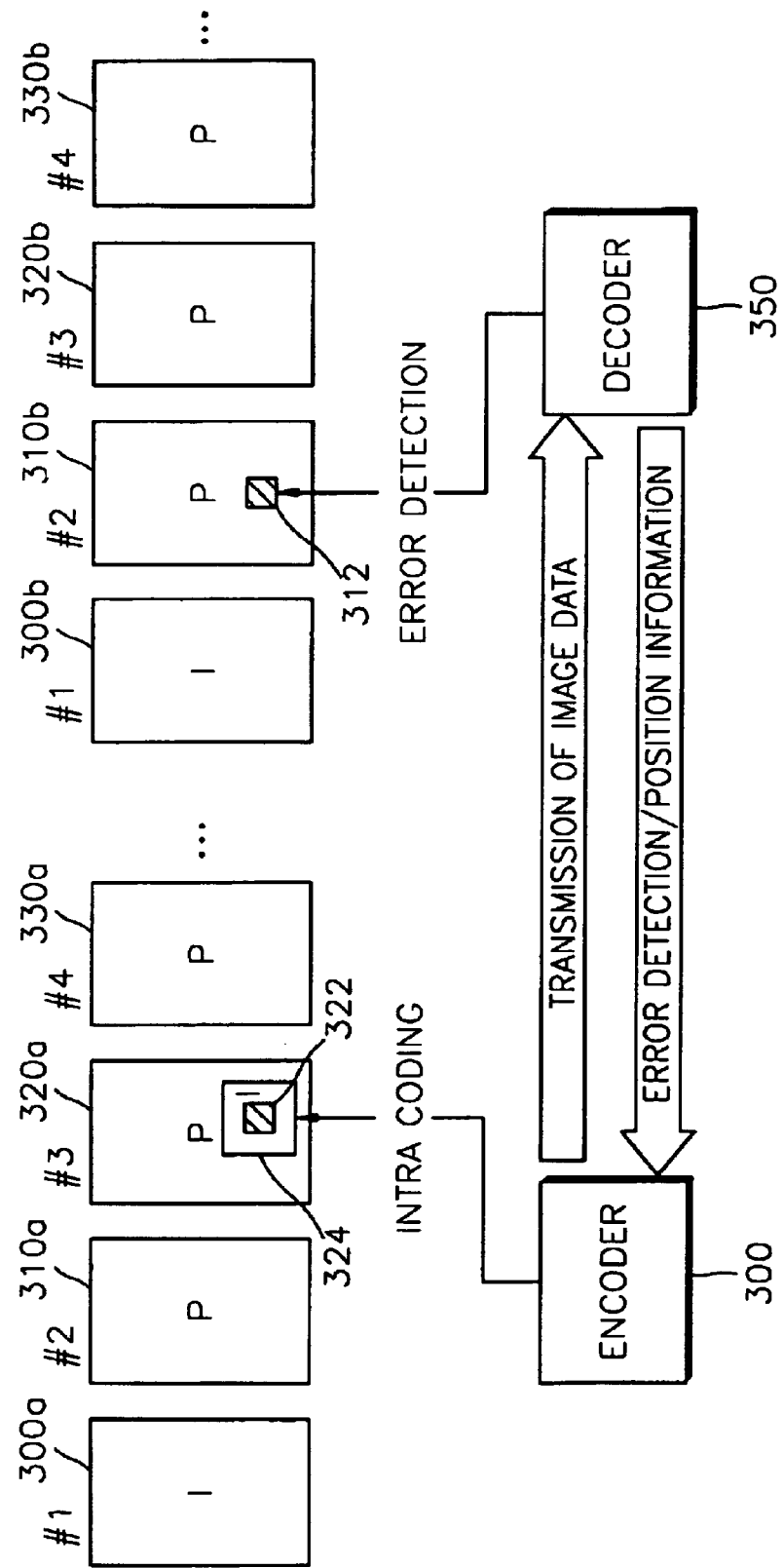
FIG. 3 is a schematic diagram illustrating an error propagation preventing mechanism in a digital image data communication system according to an embodiment of the present invention.

As shown in FIG. 3, in an embodiment of the present invention, an encoder 300, in principle, encodes the first frame 300a in a sequence using an intracoding method and encodes the subsequent frames 310a, 320a and 330a using an intercoding method. A decoder 350 decodes compressed image data 300b, 310b, 320b and 330b received via a communication channel.

It will be apparent to those skilled in the art, to which the present invention pertains, that discrete cosine transformation, quantization, variable length encoding, inverse quantization, inverse discrete cosine transformation, or the like is usually used for encoding by the encoder 300 according to an embodiment of the present invention, and that the corresponding inverse transformation is usually used for decoding by the decoder 350.

The operation of the embodiment of the present invention will now be described on the assumption that the decoder 350 has detected an error from a specific block 312 in the second frame 310b. For example, it is assumed that an error is detected from a specific block by reverse variable length coding (RVLC) or the like. The detected error excludes errors that can be restored by forward error correction. An image frame having this unrestorable error is processed more naturally to a person by a technique such as concealment, and then output.

In an embodiment of the present invention, when the decoder 350 has detected an error during decoding, feedback error information including the location of a block where the error has been detected, or the like, is transmitted to the encoder 300 via a backward channel.

The encoder 300 encodes a corresponding error block 322 and a search range 324 of the block by compulsorily using an intracoding method when the next frame 320a is encoded, with reference to the feedback error information received via a backward channel. Here, the search range denotes blocks which are referred to in order to encode a specific block using an intercoding method.

Thus, the decoder 350 receives an image frame in which an error-detected block and a search range of the block have been encoded by intracoding, so does not refer to any other frames to decode the corresponding block. Thus, an error generated on the previous frame is not propagated. Also, in this embodiment of the present invention, an error is restored or removed within a short period of time by inhibiting error propagation.

Hereinafter, the processing of image data by the encoder 300 and by the decoder 350 to realize the embodiment of the present invention of FIG. 3, will be described in more detail with reference to FIGS. 4 and 5.

Figure 4:
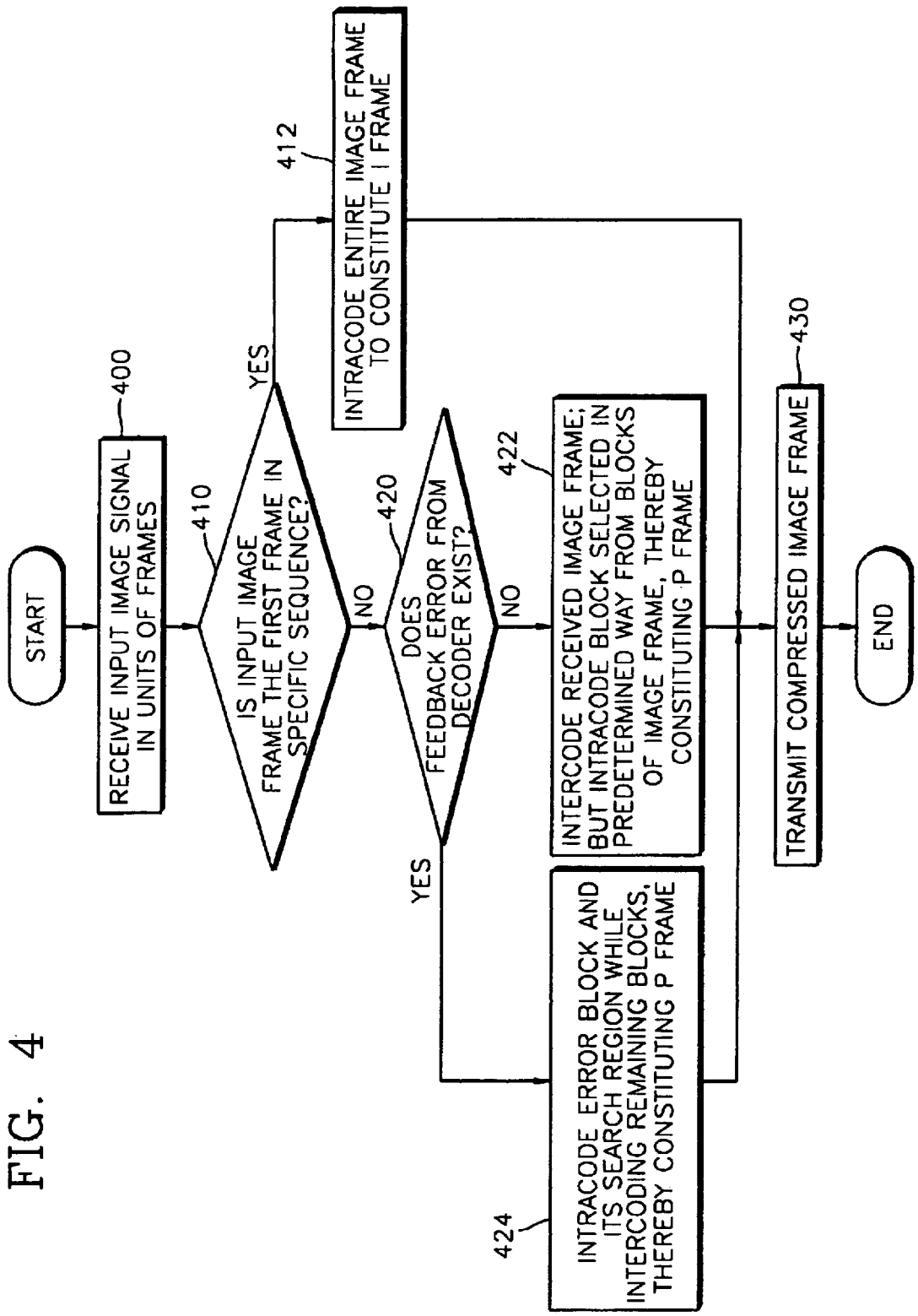
FIG. 4 is a flowchart illustrating a method of processing transmission data to inhibit error propagation in a digital image data communication system according to a preferred embodiment of the present invention.

FIG. 4 is a flowchart illustrating a method of processing transmission data to inhibit error propagation in a digital image data communication system according to a preferred embodiment of the present invention.

First, an encoder receives an external image signal, in step 400. The external image signal is input in units of frames, and an analog image signal must be converted into digital image data before encoding such as discrete cosine transformation is performed.

Next, it is determined whether the input image frame in step 400 is the first image frame in a specific sequence, in step 410. Here, a sequence denotes a group of a series of screens having the same property, the group being used at the uppermost layer in a data hierarchy structure in image data communications.

If the input image frame in step 400 is the first image frame in a specific sequence, the entire image frame is encoded by intracoding to constitute an I frame, in step 412. Compression of an image frame during this encoding has already been described.

If the input image frame in step 400 is not the first image frame in a specific sequence, feedback error information received from a decoder via a communication network is checked, in step 420. Here, the feedback error information includes the location of an erroneous block on a compressed image frame detected during decoding by a decoder. In the case when the input image frame is the first image frame in a specific sequence, the entire image frame is encoded by intracoding, so the feedback error information does not need to be checked.

Preferably, the erroneous block location included in the feedback error information is set in units of 16 (pixels)×16 (pixels) macro blocks, since the basic unit of a motion vector used for intercoding is a macro block.

Also, preferably, feedback error information, which is referred to to encode a current image frame, is associated with the image frame immediately preceding the current image frame, since as much error propagation as possible within a range allowed by the bandwidth of a communication channel can be inhibited.

If no feedback error information is received from the decoder, the image frame input in the step 400 is encoded and/or compressed in a conventional way, in step 422. That is, blocks selected in a predetermined way, among the blocks of the image frame input in step 400, are compulsorily encoded by intracoding, and the remaining blocks are encoded by intercoding, thereby forming a compressed image frame (which corresponds to a P frame on the whole). Here, blocks to be encoded compulsorily by intracoding can be selected in an appropriate way within the range of the current recommendation that one I block is included at least every 132 image frames.

If there is feedback error information received from the decoder, an error block included in the feedback error information, and its search range from the image frame input in step 400, are encoded by intracoding, while the remaining area is encoded by intercoding, thereby forming a compressed image frame (which corresponds to a P frame on the whole), in step 424. Here, the search range denotes an area which is referred to in order to encode a particular block by intercoding, as described above, and is set during the negotiation in the initial step between an encoder and a decoder. In general, it is preferable that a search range includes from 16 pixels in four directions from a specific block, that is, 9 macro blocks including the corresponding block, or includes 32 pixels in four directions from a specific block, that is, 16 macro blocks including the corresponding block.

Finally, a compressed image frame constituted through the step 412, 422 or 424 is transmitted via a communication network, in step 430.

Up to now, a method of processing transmission data in an encoder according to an embodiment of the present invention has been described. Now, a method of processing received data in a decoder according to an embodiment of the present invention will be described.

Figure 5:
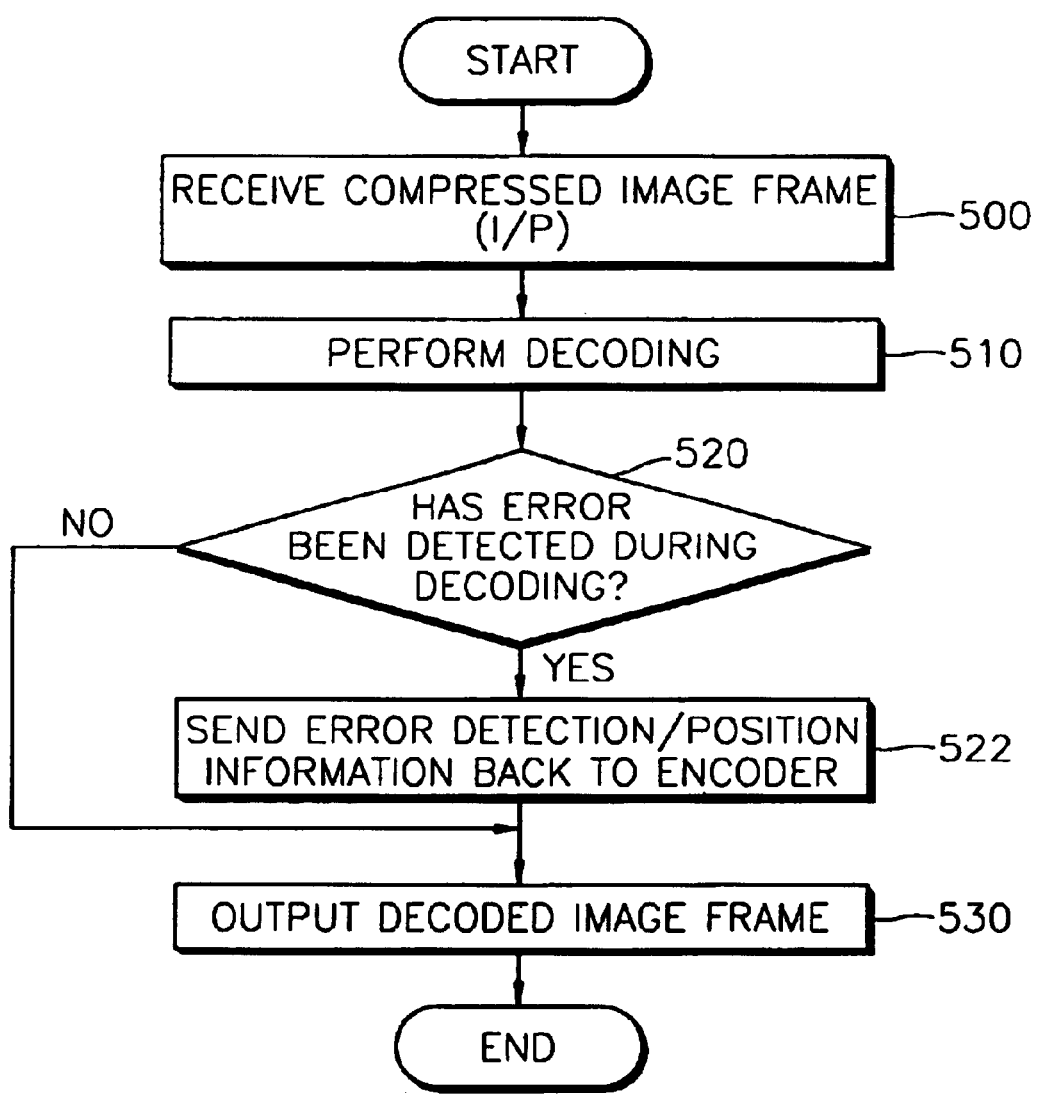
FIG. 5 is a flowchart illustrating a method of processing received data to inhibit error propagation in a digital image data communication system according to a preferred embodiment of the present invention.

FIG. 5 is a flowchart illustrating a method of processing received data to inhibit error propagation in a digital image data communication system according to a preferred embodiment of the present invention. First, a decoder receives a compressed image frame via a communication network, in step 500. Here, the compressed image frame will be an I frame encoded by intracoding or a P frame encoded by intercoding.

Next, the blocks of the compressed image frame are decoded with is reference to the encoding methods of each block of the compressed image frame received in step 500, thereby generating an output image frame, in step 510.

If it is determined in step 520 that an error is detected from a specific block during the decoding of step 510, feedback error information is fed back to the encoder via a communication network, in step 522. Here, the feedback error information includes the location of an erroneous block. As described above, it is preferable that the location of the erroneous block is set in units of 16 (pixels)×16 (pixels) macro blocks. An error can be detected by various techniques according to the application field, for example, by reverse variable length coding (RVLC) as described above.

Finally, an image frame decoded in step 510 is output, in step 530. FIG. 5 sequentially shows the feedback error information transmission procedure in steps 520 and 522 and the image frame outputting procedure in step 530. However, it will be understood by those skilled in the art, to which the present invention pertains, that these to procedures can be performed in parallel.

According to the present invention, when an error is detected by a decoder, it is fed back to an encoder, and the encoder uses a technique of compulsorily intracoding an erroneous block and the search range of the block with reference to feedback information, thereby inhibiting error propagation which occurs in a digital image data communication system. Also, through this inhibition of error propagation, error can be restored or removed within a short period of time.

Embodiments of the present invention can be written in a program that can be executed in a computer system. Also, this program can be read from a recording medium and executed by a computer. The recording medium may be a magnetic storage medium (for example, ROM, floppy discs, hard discs, etc.), an optical reading medium (for example, CD-ROM, DVD, etc.), or a carrier wave (for example, transmission through Internet).

Up to now, the present invention has been described by taking a preferred embodiment. It will be understood by those skilled in the art, to which the present invention pertains, that various modifications to the present invention may be made without departing from the essential characteristics of the present invention. Thus, the described embodiments must be considered not from a standpoint of restriction but from a standpoint of explanation. The true technical protection scope of the present invention must be determined not by the above description but by the attached claims, and all differences within the equivalent range must be interpreted to be included in the present invention.

What is claimed is:

1. A method of processing transmission data to inhibit error propagation in a digital image data communication system, the method comprising:

(a) inputting an image frame from an external source;

(b) checking for feedback error information including the location of an erroneous block on a first compressed image frame detected during decoding by a decoder, the feedback error information received via a communication network;

(c) if it is determined in step (b) that there is feedback error information, intracoding an erroneous block, the location of which is included in the feedback error information, and its search range, said search range being defined by blocks referenced to encode the erroneous block using an intercoding method, among the image frame input in step (a), thereby constituting a second compressed image frame; and (d) transmitting the compressed image frame constituted in step (c), via a communication network.

2. The method of claim 1, wherein the error block location included in the feedback error information in step (b) is set in units of 16 (pixel)×6 (pixel) macro blocks.

3. The method of claim 1, wherein the search range in step (c) includes 16 pixels or 32 pixels in four directions on the basis of the erroneous block.

4. The method of claim 1, wherein the feedback error information in step (b) is associated with the image frame immediately preceding a current image frame.

5. A method of processing transmission data to inhibit error propagation in a digital image data communication system, the method comprising:

(a) inputting an image frame from an external source;

(b) when the image frame input in step (a) is the first image frame in a specific sequence, encoding the entire image frame using an intracoding method, to constitute a compressed image frame;

(c) when the image frame input in step (a) is not the first image frame in a specific sequence, checking feedback error information including the location of an erroneous block on a compressed image frame detected during decoding by a decoder, the feedback error information received via a communication network;

(d) if it is determined in step (c) that there is feedback error information, intracoding an erroneous block, the location of which is included in the feedback error information, and its search range, said search range being defined by blocks referenced to encode the erroneous block using an intercoding method, among the image frame input in step (a), while the remaining area of the input image frame is encoded by intercoding, thereby constituting a compressed image frame, and if it is determined in step (c) that no feedback error information is received, intracoding block(s) selected by a predetermined method from among the blocks of the image frame input in step (a), and intercoding the remaining blocks, thereby constituting a compressed image frame; and (e) transmitting the compressed image frame constituted in step (b) or (d), via a communication network.

6. The method of claim 5, wherein the error block location included in the feedback error information in step (c) is set in units of 16 (pixel)×16 (pixel) macro blocks, and the search range in step (c) includes 16 pixels or 32 pixels in four directions on the basis of the erroneous block.

7. A method of processing received data to inhibit error propagation in a digital image data communication system, the method comprising:

(a) receiving a first compressed image frame via a communication network;

(b) decoding the first compressed image frame received in step (a) to constitute a first image frame;

(c) if an error is detected at a specific block on the first compressed image frame received in step (a) during the decoding in the step (b), sending feed back error information including an error block location back to an encoder via a communication network;

(d) outputting the first image frame restored in step (b);

(e) receiving a second compressed image frame in which an error detected block and a search range of the error-detected block have been encoded by intracoding in response to the feedback error information sent in step (c), from the encoder via the communication network;

(f) decoding the second compressed image frame received in step (e) referring to the error detected block and the search range of the error detected block, to constitute a second image frame; and (g) outputting the second image frame restored in step (f).

8. The method of claim 7, wherein the error block location included in the feedback error information in step (c) is set in units of 16(pixel)×16(pixel) macro blocks.

9. A computer-readable recording medium for recording a program which is executed in a computer for processing transmission data to inhibit error propagation in a digital image data communication system, the program comprising the steps of:

(a) inputting an image frame from an external source;

(b) checking feedback error information including the location of an erroneous block on a first compressed image frame detected during decoding by a decoder, the feedback error information received via a communication network;

(c) if it is determined in step (b) that there is feedback error information, intracoding an erroneous block, the location of which is included in the feedback error information, and its search range, said search range being defined by blocks referenced to encode the erroneous block using an intercoding method, among the image frame input in step (a), thereby constituting a second compressed image frame; and (d) transmitting the compressed image frame constituted in step (c), via a communication network.

10. A computer-readable recording medium for recording a program which is executed in a computer for processing transmission data to inhibit error propagation in a bidirectional digital image data communication system, the program comprising the steps of:

(a) inputting an image frame from an external source;

(b) when the image frame input in step (a) is the first image frame in a specific sequence, encoding the entire image frame using an intracoding method, to constitute a first compressed image frame;

(c) when the image frame input in step (a) is not the first image frame in a specific sequence, checking feedback error information including the location of an erroneous block on a second compressed image frame detected during decoding by a decoder, the feedback error information received via a communication network;

(d) if it is determined in step (c) that there is feedback error information, intracoding an erroneous block, the location of which is included in the feedback error information, and its search range, said search range being defined by blocks referenced to encode the erroneous block using an intercoding method, among the image frame input in step (a), while the remaining area of the input image frame is encoded by intercoding, thereby constituting a third compressed image frame, and if it is determined in step (c) that no feedback error information is received, intracoding block(s) selected by a predetermined method among the blocks of the image frame input in step (a), and intercoding the remaining blocks, thereby constituting a fourth compressed image frame; and (e) transmitting the compressed image frame constituted in step (b) or (d), via a communication network.

11. A computer-readable recording medium for recording a program which is executed in a computer for processing received data to inhibit error propagation in a digital image data communication system, the program comprising the steps of:

(a) receiving a first compressed image frame via a communication network;

(b) decoding the first compressed image frame received in step (a) to constitute a first image frame;

(c) if an error is detected at a specific block on the first compressed image frame received in step (a) during the decoding in the step (b), sending feedback error information including an error block location back to an encoder via a communication network;

(d) outputting the first image frame restored in step (b);

(e) receiving a second compressed image frame in which an error-detected block and a search range of the error-detected block have been encoded by intracoding in response to the feedback error information sent in step (c), from the encoder via the communication network;

(f) decoding the second compressed image frame received in step (e) referring to the error detected block and the search range of the error detected block, to constitute a second image frame; and (g) outputting the second image frame restored in step (f).

* * * * *